US012633425B2

(12) United States Patent　　　　(10) Patent No.: US 12,633,425 B2

Sivack et al.　　　　　　　　　　　　(45) Date of Patent: May 19, 2026

(54) CHANNEL BOXES FOR A BOILING WATER REACTOR AND METHODS OF MANUFACTURE THEREOF

(71) Applicant: Westinghouse Electric Company LLC, Cranberry Township, PA (US)

(72) Inventors: Michael Sivack, Murrysville, PA (US); Peng Xu, Columbia, SC (US); Edward J. Lahoda, Edgewood, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 678 days.

(21) Appl. No.: 17/997,610

(22) PCT Filed: May 3, 2021

(86) PCT No.: PCT/US2021/030458

§ 371 (c)(1),
(2) Date: Oct. 31, 2022

(87) PCT Pub. No.: WO2021/222889

PCT Pub. Date: Nov. 4, 2021

(65) Prior Publication Data

US 2023/0343475 A1　　Oct. 26, 2023

Related U.S. Application Data

(60) Provisional application No. 63/018,561, filed on May 1, 2020.

(51) Int. Cl.
G21C 3/322　　　(2006.01)
C04B 35/628　　(2006.01)
(Continued)

(52) U.S. Cl.
CPC ........ G21C 3/322 (2013.01); C04B 35/62863 (2013.01); C04B 35/62884 (2013.01); C04B 35/80 (2013.01); C22C 47/062 (2013.01)

(58) Field of Classification Search
CPC ...................................................... G21C 3/322
(Continued)

(56) References Cited

U.S. PATENT DOCUMENTS 9,275,762 B2　　3/2016　Garnier et al.
2012/0087457 A1　4/2012　Garnier et al.
(Continued)

FOREIGN PATENT DOCUMENTS

JP　　2013529198 A　　7/2013
JP　　2017197828 A　　11/2017
(Continued)

OTHER PUBLICATIONS

Search Report for corresponding Taiwan Patent Application No. 110115946, dated Oct. 17, 2022.
(Continued)

*Primary Examiner* — Jack W Keith
*Assistant Examiner* — Daniel Wasil
(74) *Attorney, Agent, or Firm* — K&L Gates LLP

(57) ABSTRACT

A BWR channel box comprises a substrate, a first layer, and a second layer. The substrate comprises silicon carbide fibers. The first layer is deposited on a first surface of the substrate. The second layer is deposited on an opposite second surface of the substrate. Each layer comprises a corrosion resistant metallic composition. The combined weight of both layers is in a range from greater than 0% to 10% of the total weight of the channel box.

14 Claims, 2 Drawing Sheets

(51) Int. Cl.
      *C04B 35/80*        (2006.01)
      *C22C 47/06*        (2006.01)
(58) Field of Classification Search
      USPC ........................................................ 376/444
      See application file for complete search history.

(56)                 References Cited

U.S. PATENT DOCUMENTS

| | | | |
|---|---|---|---|
| 2013/0059891 A1 | 3/2013 | Gao | |
| 2014/0185734 A1 | 7/2014 | Petroski et al. | |
| 2015/0262719 A1* | 9/2015 | Matsumiya | G21C 21/18 |
| | | | 376/327 |
| 2017/0229195 A1 | 8/2017 | Suyama et al. | |
| 2018/0327327 A1 | 11/2018 | Suyama et al. | |
| 2020/0020455 A1 | 1/2020 | Lahoda | |

FOREIGN PATENT DOCUMENTS

| | | |
|---|---|---|
| JP | 2018030754 A | 3/2018 |
| JP | 2018193259 A | 12/2018 |
| WO | 2019149386 A1 | 8/2019 |
| WO | 2021222889 A2 | 11/2021 |

OTHER PUBLICATIONS

T. Shibayama et al., "The Current Status of SiC/SiC Composites and Their Future Prospects", Journal of the Japan Institute of Metals and Materials. vol. 64, No. 11 (2000), pp. 985-991.

Y. Katoh, "Status and Prospects of SiC-Based Ceramic Composites for Fusion and Advanced Fission Applications", J. Plasma Fusion Res. vol. 80, No. 1 (2004) pp. 18-23.

International Search Report and Written Opinion for International PCT Application No. PCT/US2021/030458, dated Jan. 31, 2022.

* cited by examiner

202 — Layering silicon fibers around a form to create a preform of silicon carbide fibers 204 — Depositing an interlayer on the silicon fibers 206 — Creating the substrate 208 — Removing the substrate from the form 210 — Depositing a first layer on the substrate

CHANNEL BOXES FOR A BOILING WATER REACTOR AND METHODS OF MANUFACTURE THEREOF

CROSS-REFERENCE TO RELATED APPLICATIONS

This application is a U.S. National Stage Entry under 35 U.S.C. § 371 of International Patent Application No. PCT/US2021/030458, entitled CHANNEL BOXES FOR A BOILING WATER REACTOR AND METHODS OF MANUFACTURE THEREOF, filed May 3, 2021, which claims benefit under 35 U.S.C. § 119 (e) to U.S. Provisional Application Ser. No. 63/018,561 filed May 1, 2020. The contents of each such application are hereby incorporated by reference herein in their entireties.

BACKGROUND

A nuclear power plant comprising a boil water reactor (BWR) can include channel boxes surrounding nuclear fuel rod bundle in the core. The channel box directs coolant flow around the nuclear fuel rod bundles and inhibits vapor drift from the nuclear fuel rod bundles to a lower-pressure bypass region between channel boxes in order to maintain adequate cooling within the core of the BWR. Typically, a control blade slides around the outside of the channel boxes in order to control neutron flux within the core.

Typically, the channel box in a BWR comprises zirconium or zirconium alloy. In a radiation field, zirconium alloys grow anisotropically (e.g., grows at different lengths depending on the direction of growth. In addition, the zirconium channel boxes can be prone to corrosion and hydrogen pickup in a BWR. Hydrogen pickup can produce zirconium hydride that forms a second, hard phase in the relatively soft zirconium alloy of the channel boxes, which can be a point for cracking and can vary the direction of radiation induced growth in the channel boxes. This can lead to the distortions along the length of the channel boxes which can interfere with operation of the control blades. There are challenges with inhibiting distortion, radiation induced growth, and corrosion of control boxes in a BWR.

SUMMARY

The present disclosure provides a channel box for a boiling water reactor (BWR). The channel box comprises a substrate and a first layer. The substrate comprises a tubular shape. The substrate comprises silicon carbide fibers infiltrated with silicon carbide. The first layer is deposited on a first surface of the substrate and the first layer comprises a corrosion resistant metallic composition.

The present disclosure also provides a pre-irradiated channel box for a BWR. The channel box comprises a substrate comprising a tubular shape. The substrate comprises silicon carbide fibers. The first layer is deposited on a surface of the substrate and the first layer comprises a corrosion resistant metallic composition. Each side of the channel box has been exposed to at least one displacements per atom of radiation.

The present disclosure also provides a method for making a channel box for a boiling water reactor. The method comprises layering silicon carbide fibers around a form to create a preform of silicon carbide fibers. An interlayer is deposited on the silicon carbide fibers. A substrate is created from the preform and the substrate comprises a tubular shape. The substrate is removed from the form. A first layer is deposited on a first surface of the substrate thereby forming the channel box. The first layer comprises a corrosion resistant metallic composition.

It is understood that the inventions described in this specification are not limited to the examples summarized in this Summary. Various other aspects are described and exemplified herein.

BRIEF DESCRIPTION OF THE DRAWINGS

The features and advantages of the examples, and the manner of attaining them, will become more apparent, and the examples will be better understood by reference to the following description of examples taken in conjunction with the accompanying drawing, wherein.

Corresponding reference characters indicate corresponding parts throughout the several views. The exemplifications set out herein illustrate certain examples, in one form, and such exemplifications are not to be construed as limiting the scope of the examples in any manner.

DETAILED DESCRIPTION

Figure 1:
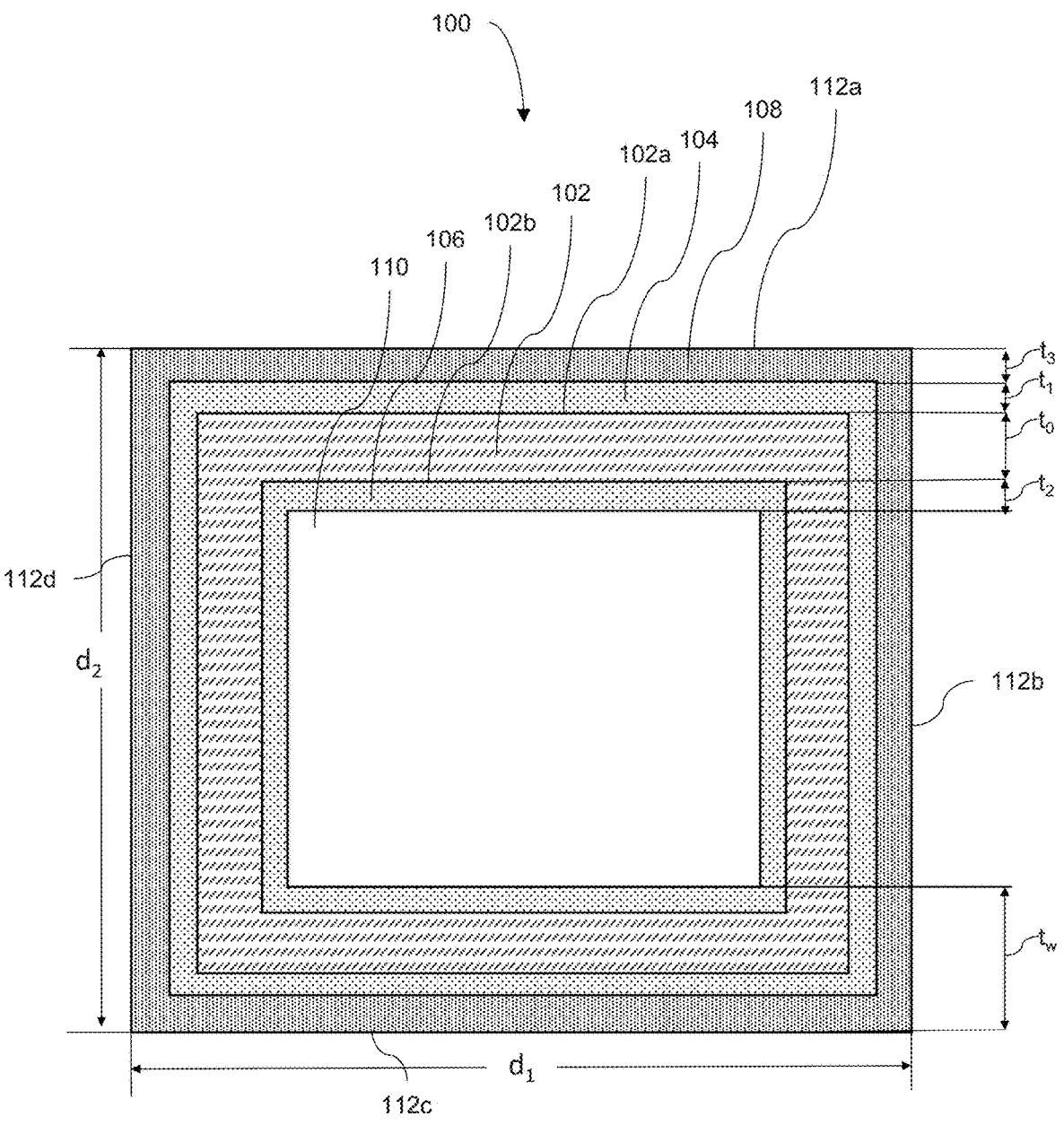
FIG. 1 is a cross section illustrating an example of a channel box according to the present disclosure.

Certain exemplary aspects of the present disclosure will now be described to provide an overall understanding of the principles of the composition, function, manufacture, and use of the compositions, articles, and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

As used in this specification, particularly in connection with layers, the terms "on," "onto," "over," and variants thereof (e.g., "applied over," "formed over," "deposited over," "provided over," "located over," "electroplated over", and the like) mean applied, formed, deposited, provided, or otherwise located over a surface of a substrate but not necessarily in contact with the surface of the substrate. For example, a layer "applied over" a substrate does not preclude the presence of another coating layer or other coating layers of the same or different composition located between the applied coating layer and the substrate. Likewise, a second layer "applied over" a first layer does not preclude the presence of another layer or other layers of the same or different composition located between the applied second layer and the applied first layer.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

If channel boxes in a BWR distort, inserting a control blade between the channel boxes can become an issue due to increased friction between the control blade and the channel boxes. Moreover, zirconium or zirconium alloy in a core of a BWR can generate hydrogen gas and heat when exposed to steam that may lead to an explosion such as during the Fukushima accidents. Typical zirconium or zirconium alloy channel boxes can account for 40% of the zirconium materials in the core of the BWR. Therefore, the present inventors provide a channel box and a method of making thereof which can resist distortion, resist corrosion, and minimizes the presence of zirconium or zirconium alloy in the core of the BWR which can improve the accident tolerance of the BWR.

Referring to FIG. 1, a cross section of a channel box 100 for a boiling water reactor is provided. The channel box 100 can comprise a tubular shape comprising a cavity 110 configured to receive nuclear fuel rod bundles and/or other nuclear reactor components as desired. In various examples, the channel box 100 can comprise a rectangular tubular shape as illustrated in FIG. 1. In various other examples, the channel box 100 can be a different shape. The dimensions of the channel box 100 can be selected to suit the desired reactor type. For example, the channel box 100 can comprise a length in a range of 1 meter (m) to 4 m for a boiling water reactor. In certain examples, the channel box can comprise a first dimension, $d_1$, and a second dimension, $d_2$, which can be the same or different. The dimensions, $d_1$ and $d_2$, can be in a range of 1 inch to 10 inches. For example, the channel box 100 can comprise a cross-sectional shape in the form of a square with dimensions, $d_1$ and $d_2$, being 6 inches each. The channel box comprising a wall thickness, $t_w$, suitable for operation in a BWR. For example, the $t_w$ can be in a range of 1 millimeter (mm) to 4 mm, such as, for example, 1 mm to 2 mm or 2 mm to 3 mm.

The channel box 100 can comprise a substrate 102, a first layer 104 and/or a second layer 106, and an optional third layer 108. The substrate 102 can comprise a tubular shape. For example, as illustrated in FIG. 1, the substrate 102 comprises a rectangular tubular shape.

The substrate 102 can comprise silicon carbide fibers infiltrated with silicon carbide, zirconium, a zirconium alloy, or a combination thereof that can provide rigidity to the channel box 100 and can resist distortion upon exposure to radiation, such as, for example, neutron radiation, gamma radiation, or a combination thereof. In some examples, the substrate 102 can consist of silicon carbide fibers infiltrated with silicon carbide and optionally an interlayer. The substrate 102 can comprise a thickness, to, suitable for providing rigidity and/or resisting distortion during operation in a Boiling Water Reactor ("BWR"). For example, the thickness, to, of the substrate 102 can be in a range of 1 millimeter (mm) to 4 mm, such as, for example, 1 mm to 2 mm or 2 mm to 3 mm. For example, the thickness, to, of the substrate 102 can be at least 1 mm.

The silicon carbide fibers of the substrate 102 can be infiltrated by chemical vapor infiltration, chemical vapor deposition, or a combination thereof. Chemical vapor infiltration is a process where a gaseous material is infiltrated into a porous preform at elevated temperatures. For example, chemical vapor infiltration of silicon carbide fibers can comprise heating the silicon carbide fibers in a reactor to an elevated temperature (e.g., at least 1000 degrees Celsius) and introducing a gaseous material into the reactor including the pores of the silicon carbide fibers. The gaseous materials can comprise a silicon carbide precursor (e.g., trichloromethylsilane) and an optional diluent (e.g., nitrogen). The trichloromethylsilane degrades into silicon carbide and hydrogen chloride at the elevated temperature. The silicon carbide is deposited over the silicon carbide fibers including within the pores and/or on the surface of the silicon carbide fibers, and the hydrogen chloride can be removed from the reactor. In examples where the silicon carbide fibers are infiltrated with zirconium or a zirconium alloy, the gaseous materials can comprise a zirconium or zirconium alloy precursor (e.g., $ZrI_4$).

In various examples, an interlayer may be formed over the silicon carbide fibers prior to introducing the gaseous material such that the interlayer is intermediate the silicon carbide fibers and the silicon carbide infiltrated therein. The interlayer can be carbon based, such as, for example, graphite. The interlayer can be deposited by heating the silicon carbide fibers in a reactor to an elevated temperature and flowing a carbon-based precursor (e.g., methane) into the reactor including pores of the silicon carbide fibers. The methane can decompose under the elevated temperature to elemental carbon and hydrogen. The interlayer can provide lubrication between the silicon carbide fibers and the silicon carbide infiltrated therein such that the substrate 102 can comprise an enhanced toughness and robustness for handling to provide a pseudo-ductility. Additionally, providing lubrication between the silicon carbide fibers and silicon carbide infiltrated therein can inhibit cracks and/or crack propagation within the substrate 102.

Chemical vapor deposition is similar to chemical vapor infiltration except the silicon carbide is deposited more on the surface of the silicon carbide fibers in chemical vapor deposition than in the pores of the silicon carbide fibers as in chemical vapor infiltration. In various examples, the silicon carbide fibers of the substrate 102 can be infiltrated by a combination of chemical vapor infiltration and chemical vapor deposition to achieve a desired porosity and/or thickness, to, of the substrate 102.

The first layer 104 can be deposited over a first surface 102*a* of the substrate 102 and the second layer 106 can be deposited over a second surface 102*b* of the substrate. For example, the first layer 104 can be directly in contact with the substrate 102 and/or the second layer 106 can be directly in contact with the substrate 102. The first and second layers, 104 and 106, can comprise a corrosion resistant metallic composition. The corrosion resistant metallic composition of the first layer 104 may be the same or different from the corrosion resistant metallic composition of the second layer 106. The corrosion resistant metallic composition of the first layer 104 and the second layer 106 can be configured to resist corrosion (e.g., dissolution, oxidation, chemical degradation) at various operation conditions within the core of a BWR.

The first and second layers 104 and 106 can be deposited over the substrate 102 in order to inhibit contact between the substrate 102 and coolant (e.g., water) within the core of the BWR and thereby inhibit corrosion of the substrate 102 that may be caused by the coolant. Therefore, the first and second layers, 104 and 106, can inhibit silicon carbide from the substrate 102 from reacting with the coolant (e.g., dissolved oxygen in water) to form silicon dioxide which may dissolve into the coolant and be deposited onto surfaces within the core of the BWR. In certain examples, the first and second layers, 104 and 106, cover substantially all of the exposed surfaces of the substrate 102. In some other others, the first and second layers, 104 and 106, selectively cover portions of the substrate 102 which will be submerged in the coolant in the BWR and other portions of the substrate 102 that may not be submerged in the coolant in the core of the BWR may not be covered by the first and second layers, 104 and 106.

The first layer 104 and the second layer 106 can comprise zirconium, a zirconium alloy, titanium, a titanium alloy, yttrium, a yttrium alloy, or a combination thereof. In various examples, the zirconium alloy can further comprise niobium, such as a binary zirconium alloy comprising niobium or a non-binary zirconium alloy comprising niobium. The zirconium alloy can comprise a nuclear grade zirconium alloy. The nuclear grade zirconium alloy can comprise Zircalloy-2™, Zircalloy-4™, ZIRLO™, optimized ZIRLO™, or a combination thereof. For example, the nuclear grade zirconium alloy can comprise a composition comprising, all based on the total weight of the nuclear grade zirconium alloy: 0.5% to 2.0% niobium; 0.7% to 1.5% tin; 0.07% to 0.14% iron; up to 0.03% carbon; up to 0.2% oxygen; and balance zirconium and incidental impurities.

The first layer 104 can comprise a thickness, $t_1$, suitable to inhibit corrosion of the substrate 102 and the second layer 106 can comprise a thickness, $t_2$, suitable to inhibit corrosion of the substrate 102. For example, the thickness, $t_1$, of the first layer 104 can be in a range of 1 micron to 20 microns, such as, for example, 5 microns to 10 microns, 10 microns to 20 microns, or 5 microns to 15 microns. The thickness, $t_2$, of the second layer 106 can be in a range of 1 micron to 20 microns, such as, for example, 5 microns to 10 microns, 10 microns to 20 microns, or 5 microns to 15 microns. Typically, silicon carbide has a smaller neutron absorption than the corrosion resistant metallic composition of the first layer 104 and the second layer 106, thus it may be desirable to minimize the thicknesses, $t_1$ and $t_2$, to enhance efficiency of the BWR during operation. Similarly, in examples where the first layer 104 and second layer 106 comprise zirconium or a zirconium alloy, it may be desirable to minimize the thicknesses, $t_1$ and $t_2$, to enhance the accident tolerance of the BWR.

The channel box 100 can comprise an amount of the first and second layers, 104 and 106, in a range of greater than 0% to 10% by weight based on the total weight of the channel box, such as, for example, 0.1% to 10%, 0.5% to 5%, or 1% to 2% all by weight based on the total weight of the channel box 100. For example, the channel box 100 can comprise an amount of the first and second layers, 104 and 106 in a range of greater than 0% to 10% by weight based on the total weight of the channel box 100 and a balance of the substrate 102, third layer 106, and optional other layers.

The third layer 108 can be deposited intermediate the first layer 104 and the substrate 102, over the first layer 104, intermediate the second layer 106 and the substrate 102, over the second layer 106, or combinations thereof. In various examples, it may be desirable to deposit the third layer 108 over the first layer 104 and the second layer 106.

The third layer 108 can comprise chromium or a chromium alloy. The third layer 108 can comprise a thickness, $t_3$, in a range of 0.1 microns to 5 microns, such as, for example, 0.5 microns to 2 microns, 0.5 microns to 1.5 microns, or 1 micron to 2 microns. The third layer 108 can be more corrosive resistant than the first layer 104 or the second layer 106. However, the third layer 108 can also comprise a greater neutron cross section than the first layer 104 or the second layer 106. Therefore, the thickness, $t_3$, should be sized to minimize the overall neutron cross section of the channel box 100 while maintaining a sufficient corrosion resistance.

In various examples, a BWRr can comprise the channel box 100. For example, a nuclear fuel rod bundle can be placed into the cavity 110 and the boiling water reactor can be operated. The channel box 100 can resist corrosion and/or distortion within the BWR such that the channel box 100 resists distortion after being subject to a fluence of at least 100 displacements per atom (dpa).

Silicon carbide can swell uniformly upon radiation exposure. Additionally, the swelling of silicon carbide can be limited or otherwise stops after a predetermined level of radiation exposure of 1 dpa. However, subjecting a channel box comprising silicon carbide, such as channel box 100, to high, non-uniform levels of radiation such as those present in the center of a core of a BWR may cause the channel box 100 to swell non-uniformly and distort. Thus, the present disclosure provides a method for pre-irradiating the channel box 100 to inhibit non-uniform swelling and distortion. The method comprises exposing the channel box 100 to radiation in a first location of a core of a BWR, wherein the first location has a lower neutron flux gradient than a neutron flux gradient in a second location in the core of the BWR. For example, the first location may be proximal to the edges (e.g., sides and/or corner) of the core of the BWR and the second location can be proximal to the center of the core of the BWR. Pre-irradiating the channel box 100 can comprise exposing the channel box to radiation until a fluence of at least one dpa is achieved, such as, for example, at least two dpa, or at least five dpa. In various examples, pre-irradiating the channel box 100 can comprise exposing the channel box 100 to radiation until a fluence in a range of one dpa to two dpa is achieved. Pre-irradiating can also comprise uniformly exposing each side of the channel box 100 to radiation until a fluence of at least one dpa is achieved such that the swelling of the channel box 100 is uniformly obtained. In examples where the channel box 100 comprises a rectangular shape, all four sides, 112a, 112b, 112c, and 112d, can be exposed to radiation uniformly.

Figure 2:
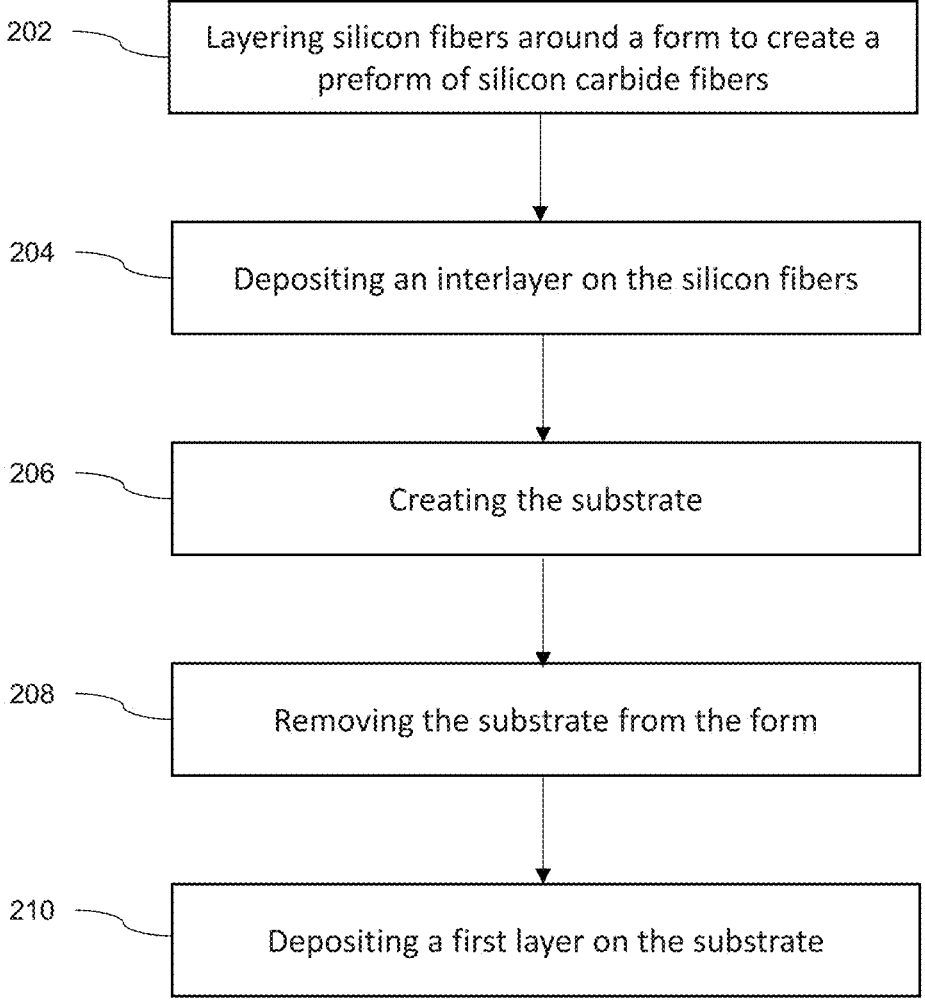
FIG. 2 is a process diagram illustrating an example of method for making a channel box according to the present disclosure.

Referring to FIG. 2, a method for making a channel box for a BWR is provided. As illustrated, the method can comprise layering silicon fibers around a form to create a preform of silicon carbide fibers, 202. The form can be a tube (e.g., a square tube), a mandrel, or similar object. Layering can comprise depositing, wrapping, braiding, winding, or combinations thereof. An interlayer can be deposited on the silicon carbide fibers, 204.

A substrate is created from the preform of silicon carbide fibers, 206. For example, the preform of silicon carbide fibers can be infiltrated with silicon carbide to form the substrate comprising a tubular shape utilizing chemical vapor infiltration, chemical vapor deposition, or a combination thereof. The infiltration of the preform with silicon carbide, zirconium, zirconium alloy, or combination thereof can decrease the porosity of the silicon carbide preform and increase the rigidity of the preform. In various examples, the process of infiltration can comprise chemical vapor infiltration and then chemical vapor deposition. In certain examples, the process of infiltration can comprise chemical vapor deposition, chemical vapor infiltration, and then chemical vapor deposition. In various examples, chemical vapor deposition is performed on the form prior to layering silicon carbide fibers around the form.

The substrate can be removed from the form, 208. A first layer can be deposited on a first surface of the substrate, wherein the first layer comprises a corrosion resistant metallic composition, 210. Optionally, a second layer can be deposited on a second surface of the substrate, wherein the second layer comprises a corrosion resistant metallic composition. In various examples, a third layer comprising chromium or chromium alloy can be deposited over the substrate. The first, second, and/or third layer can be deposited by physical vapor deposition, cold spray, thermal spray, or a combination thereof.

Various aspects of the invention according to the present disclosure include, but are not limited to, the aspects listed in the following numbered clauses.

1. A channel box for a boiling water reactor, the channel box comprising:
   a substrate comprising a tubular shape, the substrate comprising silicon carbide fibers; and
   a first layer deposited on a first surface of the substrate, wherein the first layer comprises a corrosion resistant metallic composition.

2. The channel box of clause 1, wherein the silicon carbide fibers are infiltrated with silicon carbide, zirconium, a zirconium alloy, or a combination thereof, by chemical vapor infiltration, chemical vapor deposition, or a combination thereof.

3. The channel box of clause 2, further comprising an interlayer intermediate the silicon carbide fibers and the infiltrated silicon carbide, zirconium, zirconium alloy, or combination thereof, infiltrated therein.

4. The channel box of clause 3, wherein the interlayer is carbon based.

5. The channel box of any one of clauses 1-4, wherein the corrosion resistant metallic composition comprises zirconium, a zirconium alloy, titanium, a titanium alloy, yttrium, a yttrium alloy, or a combination thereof.

6. The channel box of any one of clauses 1-5, wherein the corrosion resistant metallic composition comprises a zirconium alloy comprising niobium.

7. The channel box of any one of clauses 1-6, wherein the first layer comprises a thickness in a range of 1 micron to 20 microns.

8. The channel box of any one of clauses 1-7, further comprising a second layer deposited on a second surface of the substrate opposing the first surface of the substrate, the second layer comprising a second corrosion resistant metallic composition.

9. The channel box of clause 8, wherein the channel box comprises an amount of the first and second layers in a range of greater than 0% to 10% by total weight of the channel box.

10. The channel box of clause 8, wherein the channel box comprises an amount of the first and second layers in a range of 1% to 2% by total weight of the channel box.

11. The channel box of any one of clauses 1-10, wherein the channel box comprises a wall thickness in a range of 1 millimeter to 4 millimeters.

12. The channel box of any one of clauses 1-11, further comprising a third layer disposed over the first layer, the third layer comprises chromium or a chromium alloy.

13. The channel box of clause 12, wherein the third layer comprising a thickness in a range of 0.1 microns to 5 microns.

14. A boiling water reactor comprising the channel box of any one of clauses 1-13.

15. A method comprising pre-irradiating the channel box of any one of clauses 1-13 in a first location of a core of a boiling water reactor, wherein the first location has a lower neutron flux than a second location in the boiling water reactor.

16. The method of clause 15, wherein pre-irradiating the channel box comprises exposing the channel box to radiation until a fluence of at least one displacement per atom is achieved.

17. A pre-irradiated channel box for a boiling water reactor, the channel box comprising:
   a substrate comprising a tubular shape, the substrate comprising silicon carbide fibers; and
   a first layer deposited on a surface of the substrate, wherein the first layer comprises a corrosion resistant metallic composition,
   wherein each side of the channel box has been exposed to radiation until a fluence of at least one displacement per atom was achieved.

18. A method for making a channel box for a boiling water reactor, the method comprising:
   layering silicon carbide fibers around a form to create a preform of silicon carbide fibers;
   depositing an interlayer on the silicon carbide fibers;
   creating the substrate from the preform, wherein the substrate comprises a tubular shape;
   removing the substrate from the form; and
   depositing a first layer on a first surface of the substrate thereby forming the channel box, wherein the first layer comprises a corrosion resistant metallic composition.

19. The method of clause 18, wherein creating the substrate comprising infiltrating the preform with silicon carbide, zirconium, a zirconium alloy, or a combination thereof utilizing chemical vapor infiltration, chemical vapor deposition, or a combination thereof to create the substrate.

20. The method of any one of clauses 18-19, further comprising exposing the channel box to radiation until a fluence of at least 1 displacement per atom is achieved.

Those skilled in the art will recognize that the herein described compositions, articles, methods, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting Various features and characteristics are described in this specification to provide an understanding of the composition, structure, production, function, and/or operation of the invention, which includes the disclosed compositions, coatings, and methods. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, nuclear fuel assembly, or method that "comprises," "has," "includes," or "contains" a feature or features and/or characteristics possesses the feature or those features and/or characteristics but is not limited to possessing only the feature or those features and/or characteristics. Likewise, an element of a composition, coating, or process that "comprises," "has," "includes," or "contains" the feature or features and/or characteristics possesses the feature or those features and/or characteristics but is not limited to possessing only the feature or those features and/or characteristics and may possess additional features and/or characteristics.

The grammatical articles "a," "an," and "the," as used in this specification, including the claims, are intended to include "at least one" or "one or more" unless otherwise indicated. Thus, the articles are used in this specification to refer to one or more than one (i.e., to "at least one") of the grammatical objects of the article. By way of example, "a component" means one or more components and, thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent, publication, or other document identified in this specification is incorporated by reference into this specification in its entirety unless otherwise indicated but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with the written description, sufficiency of description, and added matter requirements.

Whereas particular examples of this invention have been described above for purposes of illustration, it will be evident to those skilled in the art that numerous variations of the details of the present invention may be made without departing from the invention as defined in the appended claims.

What is claimed is:

1. A channel box for a boiling water reactor, the channel box comprising:
   a substrate comprising a tubular shape, the substrate comprising silicon carbide fibers; and
   a first layer deposited on a first surface of the substrate, wherein the first layer comprises a corrosion resistant metallic composition; and
   a second layer deposited on a second surface of the substrate opposing the first surface of the substrate, the second layer comprising a second corrosion resistant metallic composition, wherein the combined weight of both the first and second layers is in a range from greater than 0% to 10% of the total weight of the channel box.

2. The channel box of claim 1, wherein the silicon carbide fibers are infiltrated with silicon carbide, zirconium, a zirconium alloy, or a combination thereof by chemical vapor infiltration, chemical vapor deposition, or a combination thereof.

3. The channel box of claim 2, further comprising an interlayer intermediate the silicon carbide fibers and the silicon carbide, zirconium, zirconium alloy, or combination thereof, infiltrated therein.

4. The channel box of claim 3, wherein the interlayer is carbon based.

5. The channel box of claim 1, wherein the corrosion resistant metallic composition comprises zirconium, a zirconium alloy, titanium, a titanium alloy, yttrium, a yttrium alloy, or a combination thereof.

6. The channel box of claim 5, wherein the corrosion resistant metallic composition comprises a zirconium alloy comprising niobium.

7. The channel box of claim 1, wherein the first layer comprises a thickness in a range of 1 micron to 20 microns.

8. The channel box of claim 1, wherein the combined weight of both the first and second layers is in a range from greater than 1% to 2% of the total weight of the channel box.

9. The channel box of claim 1, wherein the channel box comprises a wall thickness in a range of 1 millimeter to 4 millimeters.

10. The channel box of claim 1, further comprising a third layer disposed over the first layer, the third layer comprises chromium or a chromium alloy.

11. The channel box of claim 10, wherein the third layer comprising a thickness in a range of 0.1 microns to 5 microns.

12. A boiling water reactor comprising the channel box of claim 1.

13. A method comprising pre-irradiating the channel box of claim 1 in a first location of a core of a boiling water reactor, wherein the first location has a lower neutron flux gradient than a second location in the boiling water reactor.

14. The method of claim 13, wherein pre-irradiating the channel box comprises exposing the channel box to radiation until a fluence of at least one displacement per atom is achieved.

\* \* \* \* \*